United States Patent
Kim et al.

(10) Patent No.: US 10,020,536 B2
(45) Date of Patent: Jul. 10, 2018

(54) METHOD OF PREPARING SULFIDE-BASED SOLID ELECTROLYTE HAVING EXCELLENT AIR STABILITY

(71) Applicant: KOREA INSTITUTE OF SCIENCE AND TECHNOLOGY, Seoul (KR)

(72) Inventors: Hyoung Chul Kim, Seoul (KR); Sung Jun Choi, Seoul (KR); Jeong Hun Kim, Seoul (KR); Wo Dum Jung, Seoul (KR); Hun Gi Jung, Seoul (KR); Ji Won Son, Seoul (KR); Jong Ho Lee, Seoul (KR); Byung Kook Kim, Seoul (KR); Hae Weon Lee, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 15/404,708

(22) Filed: Jan. 12, 2017

(65) Prior Publication Data

US 2018/0053966 A1    Feb. 22, 2018

(30) Foreign Application Priority Data

Aug. 22, 2016 (KR) .................. 10-2016-0106420

(51) Int. Cl.
*H01M 10/052* (2010.01)
*H01M 10/0562* (2010.01)

(52) U.S. Cl.
CPC .................. *H01M 10/0562* (2013.01)

(58) Field of Classification Search
CPC ................ H01M 10/0562; H01M 10/052
See application file for complete search history.

(56) References Cited

U.S. PATENT DOCUMENTS

2014/0127588 A1\* 5/2014 Kato ............... H01B 1/122
                                                          429/304

FOREIGN PATENT DOCUMENTS

| JP | 7-330312 A | 12/1995 |
|---|---|---|
| JP | 2012-048971 A | 3/2012 |
| JP | 201209445 A | 5/2012 |
| KR | 10-2013-0000227 A | 2/2013 |
| KR | 10-1611403 B1 | 2/2016 |
| WO | 2005/040039 A1 | 5/2005 |

\* cited by examiner

*Primary Examiner* — Olatunji Godo
(74) *Attorney, Agent, or Firm* — Goldilocks Zone IP Law

(57) ABSTRACT

A method for preparing a sulfide-based solid electrolyte which is stable upon exposure to the air is provided. Specifically, a stabilization layer is formed on the surface of a sulfide-based solid electrolyte particle through treatment with a reactive gas.

The sulfide-based solid electrolyte with superior air stability can be obtained because oxidation or reduction reactions with water, etc. in the air occur on the stabilization layer rather than on the sulfide-based solid electrolyte particle.

10 Claims, 4 Drawing Sheets
(1 of 4 Drawing Sheet(s) Filed in Color)

METHOD OF PREPARING SULFIDE-BASED SOLID ELECTROLYTE HAVING EXCELLENT AIR STABILITY

CROSS-REFERENCE TO RELATED APPLICATIONS

This application claims, under 35 U.S.C. § 119, the priority of Korean Patent Application No. 10-2016-0106420, filed on Aug. 22, 2016, in the Korean Intellectual Property Office, the disclosure of which is incorporated herein by reference in its entirety.

DESCRIPTION ABOUT NATIONAL RESEARCH AND DEVELOPMENT SUPPORT

This work was supported by the Energy Efficiency & Resources Core Technology Program of the Korea Institute of Energy Technology Evaluation and Planning (KETEP) granted financial resource from the Ministry of Trade, Industry & Energy, Republic of Korea (No. 20152020106100).

BACKGROUND

(a) Technical Field

The present invention relates to a method for preparing a sulfide-based solid electrolyte which is stable upon exposure to air.

(b) Background Art

Nowadays, secondary batteries are widely used in many applications, from large-sized devices such as automobiles, power storage systems, etc. to small-sized devices such as mobile phones, camcorders, notebook computers, etc.

As the secondary batteries are used in wider applications, improvement in the safety and performance of the batteries is strongly required.

Among the secondary batteries, a lithium secondary battery is advantageous over a nickel-manganese battery or a nickel-cadmium battery in that it exhibits high energy density and capacity per unit area.

However, the electrolytes used in the existing lithium secondary battery are mostly liquid electrolytes such as an organic solvent. Accordingly, there have been constant safety issues such as fire due to the leakage of the electrolytes.

Therefore, interests are increasing in all-solid batteries where inorganic solid electrolytes are used instead of organic liquid electrolytes.

Because the all-solid batteries do not use liquid electrolytes, they can be prepared as safer and simpler batteries as compared to the existing secondary batteries.

The most representative solid electrolytes for all-solid batteries developed thus far are sulfide-based solid electrolytes. However, their commercialization and large-scale production are slow due to the problems of low lithium ionic conductivity at room temperature, unstable crystal phase, weak air stability, limited processability and narrow high-conductivity phase compositional ratio range.

In particular, when the sulfide-based solid electrolyte is exposed to water, severe material deterioration occurs due to hydrogen sulfide produced, e.g., from the reaction $H_2O+S \rightarrow H_2S+O$, which leads to a severe decrease in lithium ionic conductivity. That is to say, the sulfide-based solid electrolyte is difficult to be produced in large scale because of its weak air stability and this is a big obstacle to the commercialization of all-solid batteries.

To solve these problems, Korean Patent Registration No. 10-1611403, Korean Patent Publication No. 10-2013-0000227, etc. presented methods for coating the sulfide-based solid electrolyte with a lithium conductive polymer. However, these technologies are not so helpful in large-scale production and commercialization because very complicated additional processes including drying are necessary after a polymer dispersion is coated on the sulfide-based solid electrolyte.

REFERENCES OF THE RELATED ART

Patent Documents (Paten document 1) Korean Patent Registration No. 10-1611403.

(Paten document 2) Korean Patent Publication No. 10-2013-0000227.

SUMMARY

The present invention has been made to solve the above-described problems.

The present invention is directed to providing a method for easily preparing a sulfide-based solid electrolyte with improved air stability.

The present invention is also directed to providing a preparation method which can greatly contribute to large-scale production and commercialization of a sulfide-based solid electrolyte with superior air stability.

Other features and aspects of the present invention will be apparent from the following detailed description, drawings and claims.

A method for preparing a sulfide-based solid electrolyte with superior air stability according to an exemplary embodiment of the present invention may include: 1) a step of preparing a sulfide-based solid electrolyte particle; and 2) a step of forming a stabilization layer on the surface of the sulfide-based solid electrolyte particle by treating the sulfide-based solid electrolyte particle under a reactive gas atmosphere.

A method for preparing a sulfide-based solid electrolyte with superior air stability according to another exemplary embodiment of the present invention may include: 1) a step of preparing a sulfide-based solid electrolyte particle; 2) a step of crystallizing the sulfide-based solid electrolyte particle by pre-heat treating the same; and 3) a step of forming a stabilization layer on the surface of the sulfide-based solid electrolyte particle by treating the crystallized sulfide-based solid electrolyte particle under a reactive gas atmosphere.

In a specific exemplary embodiment of the present invention, the stabilization layer may be formed by heat treatment or plasma treatment under a reactive gas atmosphere.

In a specific exemplary embodiment of the present invention, the stabilization layer may be formed by heat-treating the sulfide-based solid electrolyte particle under specific temperature and specific time conditions under a reactive gas atmosphere.

In a specific exemplary embodiment of the present invention, the stabilization layer may be formed as a reactant derived from the reactive gas is physically or chemically bound to the surface of the sulfide-based solid electrolyte particle.

In a specific exemplary embodiment of the present invention, the reactive gas may be one or more of a nitrogen oxide-based gas, an oxygen-based gas, nitrogen gas, a carbon oxide-based gas, a hydrocarbon-based gas, an organic gas, a sulfur oxide-based gas, a chlorine-based gas, a fluorine-based gas and a silicon-based gas.

In a specific exemplary embodiment of the present invention, the reactive gas may be supplied to the sulfide-based solid electrolyte particle at a pressure of 1-10 bars.

In a specific exemplary embodiment of the present invention, in the step 1), a mixture containing phosphorus pentasulfide ($P_2S_5$) and lithium sulfide ($Li_2S$) may be prepared and an amorphous sulfide-based solid electrolyte particle may be prepared by milling the mixture.

The present invention provides the following advantageous effects.

According to the present invention, a sulfide-based solid electrolyte with superior air stability can be obtained because the stabilization layer protects the sulfide-based solid electrolyte particle from moisture, etc. contained in the air and, therefore, lithium ionic conductivity is not significantly decreased even after exposure to the air.

According to the present invention, the sulfide-based solid electrolyte with superior air stability can be prepared by supplying the reactive gas at the predetermined pressure and conducting the heat treatment at the specific temperature and time easily without additional equipment.

Therefore, according to the present invention, the sulfide-based solid electrolyte with superior air stability can be produced in large scale and it can greatly contribute to commercialization of an all-solid battery containing the sulfide-based solid electrolyte.

BRIEF DESCRIPTION OF DRAWINGS

The patent or application file contains at least one drawing executed in color. Copies of this patent or patent application publication with color drawings will be provided by the Office upon request and payment of the necessary fee.

DETAILED DESCRIPTION

Figure 1:
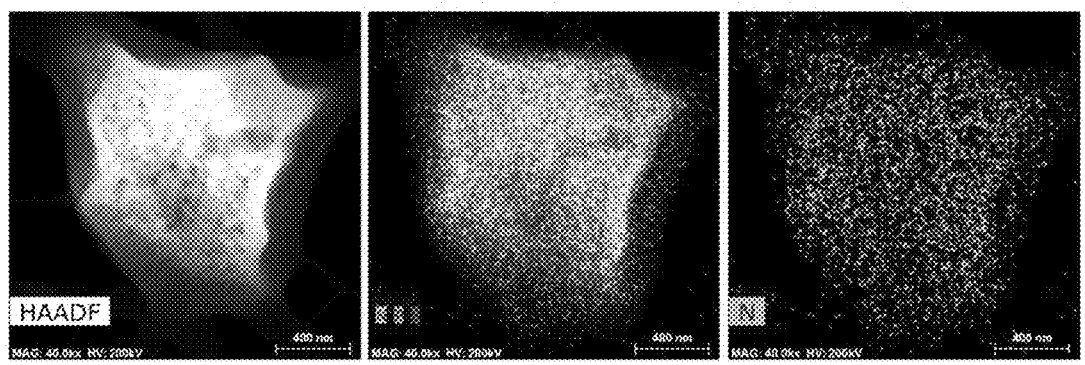
FIG. 1 shows a result of transmission electron microscopy and energy-dispersive X-ray spectroscopy in Test Example 1.

Hereinafter, the present invention is described in detail through exemplary embodiments. The exemplary embodiments of the present invention can be modified variously as long as the gist of the present invention is not changed. However, the scope of the present invention is not limited by the exemplary embodiments.

Description about known constitutions and functions will be omitted to avoid unnecessarily obscuring the gist of the present invention.

In the present invention, "contain" means that there may be additional constituent elements unless specified otherwise.

The existing method for preparing a sulfide-based solid electrolyte focuses on obtaining a Li—P—S sulfide-based solid electrolyte of a specific phase with high ionic conductivity by controlling the mixing ratio of raw materials such as lithium sulfide ($Li_2S$), phosphorus pentasulfide ($P_2S_5$), etc. and the heat treatment condition.

In addition, the preparation process is conducted under an inert gas atmosphere with extremely low oxygen and moisture contents in order to synthesize a high-purity sulfide-based solid electrolyte containing no secondary phases or impurities.

That is to say, the key point of the existing method is to prepare a high-purity sulfide-based solid electrolyte with a high-conductivity phase. For example, thio-LISICON and $Li_7P_3S_1$ crystal phases exhibit ionic conductivity of about 1 mS/cm or higher at room temperature before exposure to the air.

However, it is reported that the conductivity of these sulfide-based solid electrolytes decreases rapidly to about 0.3 mS/cm within 1 hour after exposure to the air. It is because degenerative reactions as those represented by Reaction Formula 1 and Reaction Formula 2 occur upon exposure to the air.

[Reaction Formula 1]

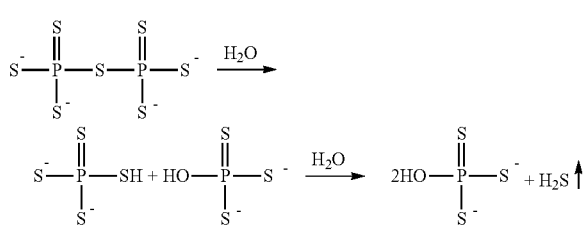

[Reaction Formula 2]

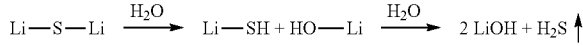

The existing sulfide-based solid electrolyte is limited in that large-scale production is difficult due to weak air stability and production cost is high. This is a big obstacle to the commercialization of all-solid batteries.

In the present invention, which has been made to overcome the limitations of the prior art, a stabilization layer is formed on the surface of a sulfide-based solid electrolyte particle by treating with a reactive gas. According to the present invention, a sulfide-based solid electrolyte with superior air stability can be obtained because oxidation or reduction reactions with water, etc. in the air occur on the stabilization layer rather than on the sulfide-based solid electrolyte particle.

A method for preparing the stabilization layer in the present invention may be largely classified into two methods as described below.

A method for preparing a sulfide-based solid electrolyte with superior air stability according to an exemplary embodiment of the present invention includes: a step of preparing a sulfide-based solid electrolyte particle; and 2) a step of forming a stabilization layer on the surface of the sulfide-based solid electrolyte particle by treating the sulfide-based solid electrolyte particle under a reactive gas atmosphere.

In the step 1), a mixture containing a sulfide material and lithium sulfide ($Li_2S$) may be prepared and an amorphous sulfide-based solid electrolyte particle may be prepared by milling the mixture.

The sulfide material may be phosphorus sulfide such as $P_2S_3$, $P_2S_5$, $P_4S_3$, $P_4S_5$, $P_4S_7$ and $P_4S_{10}$. Specifically, phosphorus pentasulfide ($P_2S_5$) may be used.

The sulfide material may further contain a substitutional element. The substitutional element may be boron (B), carbon (C), nitrogen (N), aluminum (Al), silicon (Si), vanadium (V), manganese (Mn), iron (Fe), cobalt (Co), nickel (Ni), copper (Cu), zinc (Zn), gallium (Ga), germanium (Ge), arsenic (As), selenium (Se), silver (Ag), cadmium (Cd), indium (In), tin (Sn), antimony (Sb), tellurium (Te), lead (Pb), bismuth (Bi), etc.

Specifically, the lithium sulfide may be one containing less impurities in order to avoid undesired side reactions. The lithium sulfide may be synthesized by the method of Japanese Patent Publication No. 7-330312 (JP 7-330312 A) and may be purified by the method of PCT Publication No. WO 2005/040039.

In the present invention, a mixing ratio of the sulfide material and the lithium sulfide is not particularly limited. Specifically, 20-40 mol % of the sulfide material may be mixed with 60-80 mol % of the lithium sulfide.

An amorphous sulfide-based solid electrolyte particle may be prepared by milling the mixture.

In the present invention, the milling method is not particularly limited. Specifically, a mechanical milling process may be used. More specifically, a ball mill such as an electric ball mill, a vibratory ball mill, a planetary ball mill, etc., a spiral, ribbon-type, screw-type or high-speed container-fixed type mixing grinder or a cylindrical, twin cylindrical, horizontal cylindrical, V-type or a double conical complex-type mixing grinder may be used.

In the step 2), a stabilization layer protecting the sulfide-based solid electrolyte from the air is formed on the surface of the sulfide-based solid electrolyte particle.

The stabilization layer may be formed by treating the sulfide-based solid electrolyte particle with heat or a plasma under a reactive gas atmosphere. Specifically, the stabilization layer may be formed by supplying a reactive gas to the sulfide-based solid electrolyte particle at a specific pressure and heat-treating the same under a specific condition so that a reactant contained in the reactive gas is physically or chemically bound to the surface of the sulfide-based solid electrolyte particle.

The reactive gas may be one or more of a nitrogen oxide ($N_xO_y$)-based gas, an oxygen ($O_x$)-based gas, a nitrogen ($N_2$) gas, a carbon oxide ($CO_x$)-based gas, a hydrocarbon ($C_xH_y$)-based gas, an organic ($C_xH_yO_z$) gas, a sulfur oxide ($S_xO_y$)-based gas, a chlorine (Cl)-based gas, a fluorine (F)-based gas and a silicon (Si)-based gas.

Specifically, the following compounds may be used as the reactive gas.

The nitrogen oxide ($N_xO_y$)-based gas may be nitrogen monoxide (NO), nitrogen dioxide ($NO_2$), nitrous oxide ($N_2O$), dinitrogen trioxide ($N_2O_3$), dinitrogen tetroxide ($N_2O_4$), dinitrogen pentoxide ($N_2O_5$), nitrogen ($N_2$), etc.

The oxygen ($O_x$)-based gas may be oxygen ($O_2$), ozone ($O_3$), etc.

The carbon oxide ($CO_x$)-based gas may be carbon monoxide (CO), carbon dioxide ($CO_2$), etc.

The hydrocarbon ($C_xH_y$)-based gas may be benzene ($C_6H_6$), hexane ($C_6H_{14}$), heptane ($C_7H_{16}$), etc.

The organic ($C_xH_yO_z$) gas may be diethyl ether ($C_2H_{10}O$), etc.

The sulfur oxide ($S_xO_y$)-based gas may be sulfur monoxide (SO), sulfur dioxide ($SO_2$), sulfur trioxide ($SO_3$), etc.

The chlorine (Cl)-based gas may be chloroform ($CH_3Cl$), chlorine monoxide (ClO), dichlorine monoxide ($Cl_2O$), chlorine dioxide ($ClO_2$), chlorine ($Cl_2$), etc.

The fluorine (F)-based gas may be oxygen fluoride ($OF_2$, $O_2F_2$, $O_3F_2$), fluororesin gas, etc.

The silicon (Si)-based gas may be a halosilane ($SiF_4$, $SiCl_3F$, $SiCl_2FBr$), an organosilane, a heterosilane, a silanol, etc.

However, the reactive gas is not limited to the above-described compounds and any compound containing a reactant described below may be used.

The reactive gas may be supplied to the sulfide-based solid electrolyte particle through various methods. Specifically, after putting the sulfide-based solid electrolyte particle in a closed system container, the reactive gas may be injected into the container. Or, the reactive gas may be continuously supplied in an open system at a constant flow rate.

Specifically, the reactive gas may be injected to the sulfide-based solid electrolyte particle at a pressure of 1-1000 bars, 1-100 bars or 1-10 bars. When the reactive gas is injected at a pressure below 1 bar, reaction time is prolonged and the stabilization layer is not formed enough. And, when the reactive gas is injected at a pressure exceeding 10 bars, an excessively thick stabilization layer may be formed and the high-conductivity phase may turn into a low-conductivity phase.

After the reactive gas is uniformly supplied to the sulfide-based solid electrolyte particle, the sulfide-based solid electrolyte particle may be heat-treated at a specific condition to form a stabilization layer containing a reactant derived from the reactive gas on its surface.

The heat treatment for forming the stabilization layer from the reactive gas may be performed at various temperatures ranging from room temperature (25° C.) to about 400° C. The treatment (heat treatment) in the step 2) is not only for forming the stabilization layer but also for crystallizing the amorphous sulfide-based solid electrolyte particle.

Accordingly, the heat treatment may be performed specifically at 200-400° C. for 1 minute to 10 hours. When the heat treatment temperature is below 200° C. and the heat treatment time is shorter than 1 minute, it may be difficult to crystallize the sulfide-based solid electrolyte particle. And, when heat treatment temperature is above 400° C. and the heat treatment time is longer than 10 hours, the lithium ionic conductivity of the sulfide-based solid electrolyte particle may decrease.

The stabilization layer contains a reactant derived from the reactive gas. Oxidation or reduction reactions occur between water, etc., in the air and the reactant instead of the sulfide-based solid electrolyte particle. Accordingly, the air stability of the sulfide-based solid electrolyte is improved.

The reactant may exist in the stabilization layer as a functional group in the form of a polar molecule or as a functional group in the form of a radical, although not being limited thereto. It is because it has to have high reactivity with water or other components in the air. Specifically, it may be a nitrogen monoxide functional group (—NO), a nitrogen functional group (—N), an oxygen functional group (—O), a chlorine functional group (—Cl), a fluorine functional group (—F), a silicon functional group (—Si), etc. as a material derived from the reactive gas.

A method for preparing a sulfide-based solid electrolyte with superior air stability according to another exemplary embodiment of the present invention includes: 1) a step of preparing a sulfide-based solid electrolyte particle; 2) a step of crystallizing the sulfide-based solid electrolyte particle by pre-heat-treating the same; and 3) a step of forming a stabilization layer on the surface of the sulfide-based solid electrolyte particle by treating the crystallized sulfide-based solid electrolyte particle under a reactive gas atmosphere.

Regarding another exemplary embodiment of the present invention, description about the same constitutions or steps as those described above will be omitted to avoid redundancy.

The another exemplary embodiment of the present invention is distinguished from the exemplary embodiment of the present invention described above in that the sulfide-based solid electrolyte particle is crystallized by pre-heat treating before the reactive gas is injected.

Because the heat treatment in the step 2) is for crystallizing the sulfide-based solid electrolyte particle, it may be performed specifically at 200-400° C. for 1 minute to 10 hours for the same reason as described above.

In the step 3), a reactive gas is supplied to the crystallized sulfide-based solid electrolyte particle and then a stabilization layer is formed on the surface of the sulfide-based solid electrolyte particle by treating the same with heat or a plasma.

Specifically, the stabilization layer may be formed by heat-treating the crystallized sulfide-based solid electrolyte particle at 25-400° C., more specifically at 25-200° C., for 1 minute to 10 hours.

If the sulfide-based solid electrolyte particle is crystallized and then the stabilization layer is formed on its surface as in the another exemplary embodiment of the present invention, superior air stability may be ensured while maintaining high lithium conductivity because a high-conductivity phase is formed more stably through crystallization and then the stabilization layer is formed thereon.

EXAMPLES

The present invention will be described in more detail through examples. The following examples are for illustrative purposes only and it will be apparent to those skilled in the art that the scope of this invention is not limited by the examples.

Examples

In Examples 1-3, sulfide-based solid electrolytes were prepared according to an exemplary embodiment of the present invention. In Examples 4-6, sulfide-based solid electrolytes were prepared according to another exemplary embodiment of the present invention. In the examples, a mixture of 90 mol % of argon (Ar) gas and 10 mol % of nitrogen monoxide (NO) was used as a reactive gas.

Example 1

1) 2 g of a mixture of lithium sulfide and phosphorus pentasulfide at a molar ratio of 7:3 was put in a container containing a grinding medium. Zirconia ($ZrO_2$) beads were used as the grinding medium. A planetary mill container made of zirconia was used as the container. A sulfide-based solid electrolyte particle was obtained by performing continuous grinding (milling) using a planetary mill at about 650 rpm for about 12 hours.

2) The sulfide-based solid electrolyte particle was put in an airtight Pyrex container having a cork for sealing and nitrogen monoxide (NO) was injected into the airtight container as a reactive gas at room temperature (about 25° C.) and at about 1.5 bars (absolute atmospheric pressure). Then, a sulfide-based solid electrolyte was obtained as a crystallized powder by performing heat treatment at about 260° C. for about 2 hours.

Example 2

A sulfide-based solid electrolyte was prepared in the same manner as in Example 1 except that the heat treatment temperature was set to 310° C.

Example 3

A sulfide-based solid electrolyte was prepared in the same manner as in Example 1 except that the heat treatment temperature was set to 360° C.

Example 4

1) 2 g of a mixture of lithium sulfide and phosphorus pentasulfide at a molar ratio of 7:3 was put in a container containing a grinding medium. Zirconia ($ZrO_2$) beads were used as the grinding medium. A planetary mill container made of zirconia was used as the container. A sulfide-based solid electrolyte particle was obtained by performing continuous grinding (milling) using a planetary mill at about 650 rpm for about 12 hours.

2) The sulfide-based solid electrolyte particle was crystallized by pre-heat—treating at about 260° C. for about 2 hours.

3) The crystallized sulfide-based solid electrolyte particle was cooled sufficiently at room temperature for about 1 hour and put in an airtight Pyrex container. Nitrogen monoxide (NO) was injected into the airtight container as a reactive gas at room temperature (about 25° C.) and at about 1.5 bars (absolute atmospheric pressure). Then, a sulfide-based solid electrolyte was obtained as a powder by maintaining at room temperature (about 25° C.) for about 2 hours.

Example 5

A sulfide-based solid electrolyte was prepared in the same manner as in Example 4 except that the (heat treatment) temperature in the step 3) was set to 100° C.

Example 6

A sulfide-based solid electrolyte was prepared in the same manner as in Example 4 except that the (heat treatment) temperature in the step 3) was set to 200° C.

COMPARATIVE EXAMPLES

Sulfide-based solid electrolytes of comparative examples were prepared without a step of forming a stabilization layer through treatment with a reactive gas when compared with the examples.

Comparative Example 1

1) 2 g of a mixture of lithium sulfide and phosphorus pentasulfide at a molar ratio of 7:3 was put in a container containing a grinding medium. Zirconia ($ZrO_2$) beads were used as the grinding medium. A planetary mill container made of zirconia was used as the container. A sulfide-based solid electrolyte particle was obtained by performing continuous grinding (milling) using a planetary mill at about 650 rpm for about 12 hours.

2) The sulfide-based solid electrolyte particle was put in an airtight Pyrex container and 99.999% high-purity argon (Ar) gas was injected into the airtight container as an inert gas at room temperature (about 25° C.) and at about 1.5 bars (absolute atmospheric pressure). Then, a sulfide-based solid electrolyte was obtained as a crystallized powder by performing heat treatment at about 260° C. for about 2 hours.

Comparative Example 2

A sulfide-based solid electrolyte was prepared in the same manner as in Comparative Example 1 except that the heat treatment temperature was set to 310° C.

Comparative Example 3

A sulfide-based solid electrolyte was prepared in the same manner as in Comparative Example 1 except that the heat treatment temperature was set to 360° C.

Test Example 1—Electron Microscopy

It was investigated whether the stabilization layer was formed well on the surface of the sulfide-based solid electrolyte particle through electron microscopy.

The shape and elemental distribution of the sulfide-based solid electrolyte of Example 1 were analyzed by transmission electron microscopy (TEM) and energy-dispersive X-ray spectroscopy (EDS). The result is shown in FIG. 1.

From the uniform distribution of sulfur (S) and phosphorus (P) shown in FIG. 1, it can be seen that the sulfide-based solid electrolyte was formed well as a single-phase compound. Also, from the uniform distribution of nitrogen (N) shown in FIG. 1, it can be seen that the stabilization layer (nitride/oxynitride film) was formed well through the treatment of the sulfide-based solid electrolyte with the reactive gas.

Test Example 2—Infrared Spectroscopy

The formation of the stabilization layer was further investigated through infrared spectroscopy.

The presence and distribution of functional groups on the surface of the sulfide-based solid electrolyte of Example 6 through the treatment with the reactive gas (nitrogen monoxide) was analyzed by Fourier transform infrared spectroscopy (FT-IR). Also, the surface of the sulfide-based solid electrolyte of Comparative Example 1 was analyzed in the same manner. The result is shown in FIG. 2.

Figure 2:
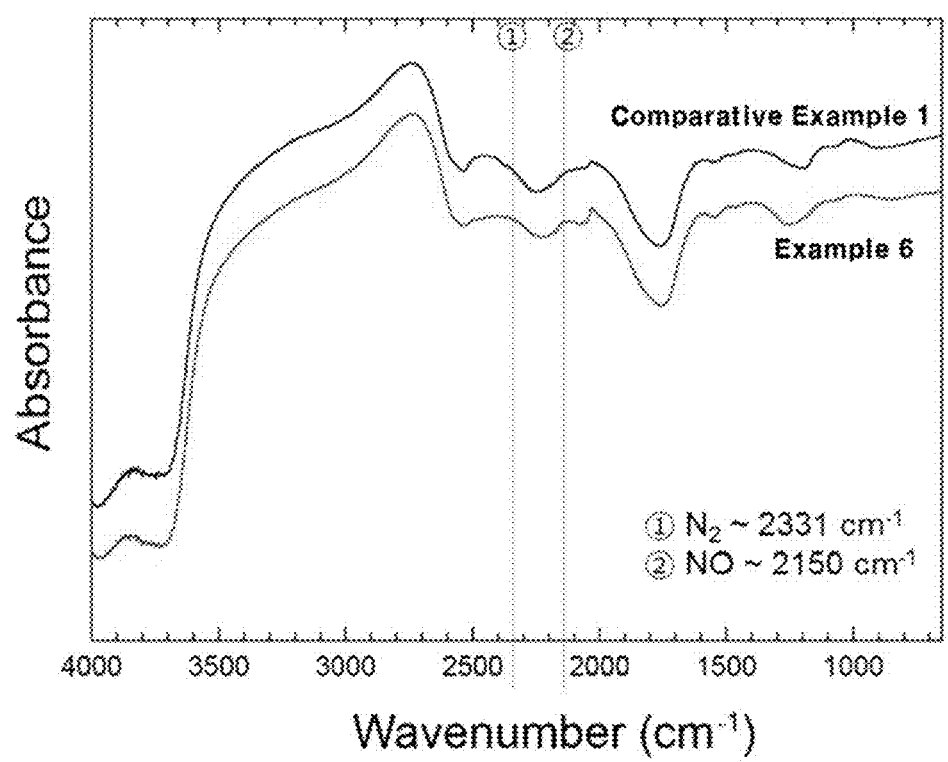
FIG. 2 shows a result of infrared spectroscopy in Test Example 2.

Referring to FIG. 2, peaks were observed at about 2331 $cm^{-1}$ and about 2150 $cm^{-1}$ for Example 6 unlike Comparative Example 1. This means the presence of nitrogen (N) functional groups and nitrogen monoxide (NO) functional groups, respectively. On the surface of the sulfide-based solid electrolyte of Example 6, the stabilization layer was formed well as the reactants derived from the reactive gas were physically or chemically bound.

Test Example 3—Measurement of Characteristics of Crystalline Structure Through XRD Analysis In order to investigate the air stability of the sulfide-based solid electrolytes of the examples, crystalline structures were analyzed by X-ray diffraction (XRD) before and after exposure to the air.

The exposure to the air was conducted by keeping vials containing the sulfide-based solid electrolytes of the examples in the form of powder in a constant-temperature, constant-humidity apparatus maintained at 25° C. and 60% humidity for 1 hour.

Before and after the exposure to the air, the sulfide-based solid electrolytes were placed on an airtight holder for XRD and measurement was made at a scanning rate of 2°/min from 2θ=10° to 2θ=60°. The result is shown in FIG. 3 and FIG. 4.

Figure 3:
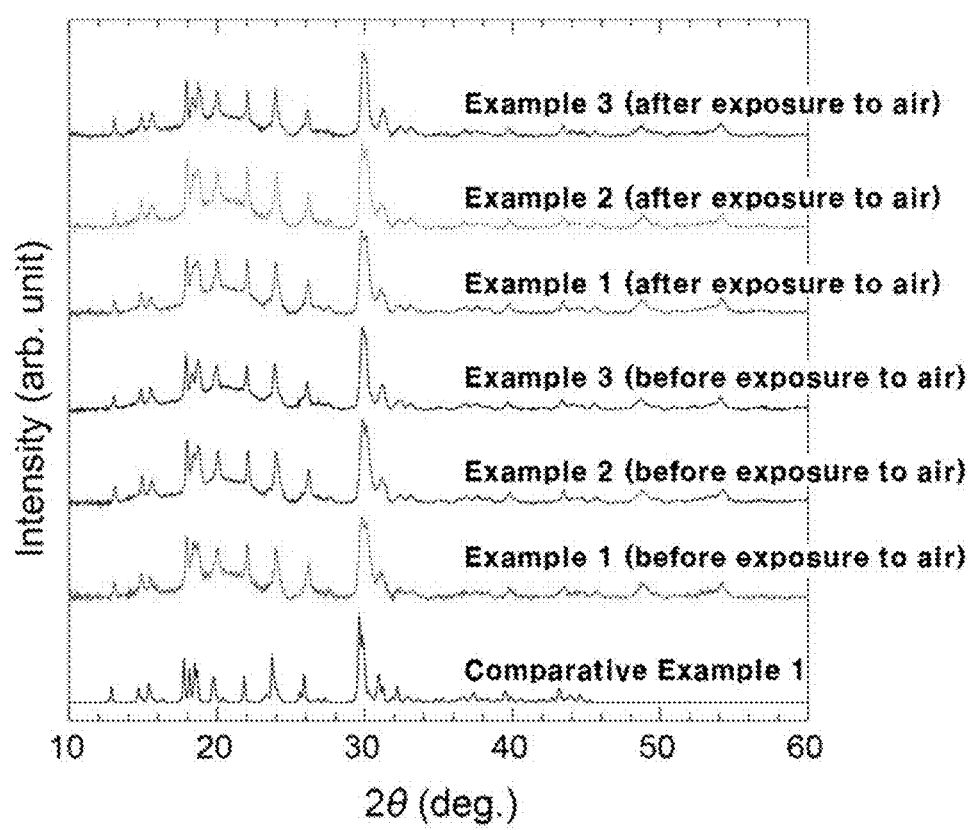
FIG. 3 shows a result of XRD analysis in Test Example 3 (Examples 1-3).

Referring to FIG. 3, there was no change in crystal structure before and after the exposure to the air (at 25° C. and 60% relative humidity for 1 hour) for the sulfide-based solid electrolytes of Examples 1-3.

Figure 4:
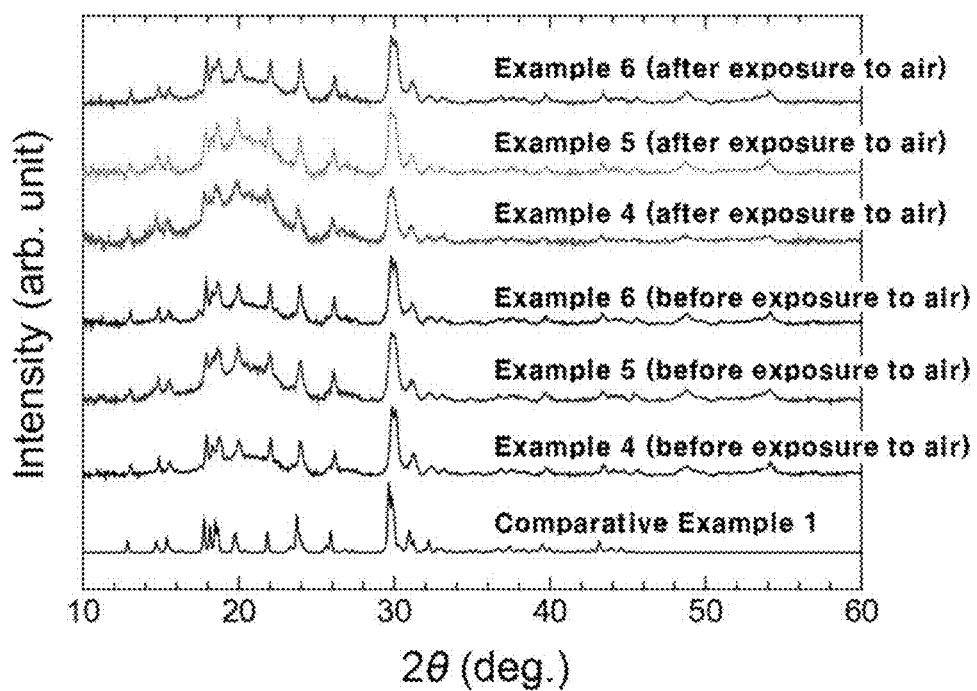
FIG. 4 shows a result of XRD analysis in Test Example 3 (Examples 4-6).

Referring to FIG. 4, there was no change in crystal structure before and after the exposure to the air (at 25° C. and 60% humidity for 1 hour) for the sulfide-based solid electrolytes of Examples 4-6.

Through this, it can be seen that the sulfide-based solid electrolytes of the examples can stably maintain their crystal structures without degenerative reactions as those of Reaction Formulas 1 and 2 when exposed to the air.

Test Example 4—Measurement of Ionic Conductivity Through AC Impedance Analysis

The air stability of the sulfide-based solid electrolytes of the examples and comparative examples was evaluated by measuring ionic conductivity before and after exposure to the air. The exposure to the air was performed in the same manner as in Test Example 3.

Each sulfide-based solid electrolyte was loaded in a mold for conductivity measurement and a sample with a diameter of 6 mm and a thickness of 0.6 mm was prepared by applying pressure along a single axis. The impedance of the sample was measured by conducting frequency sweep from $1 \times 10^7$ to 1 Hz with an AC voltage of 50 mV. The result is shown in Table 1.

TABLE 1

| | First heat treatment | | Second heat treatment | | Ionic conductivity [mS/cm] | |
|---|---|---|---|---|---|---|
| | Temperature/ time | Atmosphere/ pressure | Temperature/ time | Atmosphere/ pressure | Before exposure to air | After exposure to air |
| Example 1 | 260° C./2 hr | NO/1.5 bars | — | — | 1.77 | 0.77 |
| Example 2 | 310° C./2 hr | | | | 1.37 | 0.60 |
| Example 3 | 360° C./2 hr | | | | 1.35 | 0.61 |
| Example 4 | 260° C./2 hr | Ar/1 bar | 25° C./2 hr | NO/1.5 bars | 1.56 | 0.68 |
| Example 5 | 310° C./2 hr | | 100° C./2 hr | | 2.00 | 0.80 |
| Example 6 | 360° C./2 hr | | 200° C./2 hr | | 2.20 | 1.00 |

TABLE 1-continued

| | First heat treatment | | Second heat treatment | | Ionic conductivity [mS/cm] | |
|---|---|---|---|---|---|---|
| | | | | | Before | After |
| | Temperature/ time | Atmosphere/ pressure | Temperature/ time | Atmosphere/ pressure | exposure to air | exposure to air |
| Comparative Example 1 | 260° C./2 hr | Ar/1 bar | — | — | 2.00 | 0.60 |
| Comparative Example 2 | 310° C./2 hr | | | | 1.80 | 0.60 |
| Comparative Example 3 | 360° C./2 hr | | | | 0.01 | 0.01 |

From Table 1, it can be seen that whereas the ionic conductivity before the exposure to the air is similar in the examples and the comparative examples (much higher in examples 4 to 6), the ionic conductivity is remarkably higher in the examples after exposure to the air. That is to say, it can be seen that the sulfide-based solid electrolytes of the examples exhibit superior air stability because they show high ionic conductivity even after exposure to the air.

The present invention has been described in detail with reference to specific embodiments thereof. However, it will be appreciated by those skilled in the art that various changes and modifications may be made in these embodiments without departing from the principles and spirit of the invention, the scope of which is defined in the appended claims and their equivalents.

What is claimed is:

1. A method for preparing a sulfide-based solid electrolyte with superior air stability, comprising:
preparing a sulfide-based solid electrolyte particle; and
forming a stabilization layer on the surface of the sulfide-based solid electrolyte particle by treating the sulfide-based solid electrolyte particle under a reactive gas atmosphere,
wherein the reaction gas atmosphere is:
one or more nitrogen oxide-based gas of nitrogen monoxide (NO), nitrogen dioxide (NO2), nitrous oxide (N2O), dinitrogen trioxide (N2O3), dinitrogen tetroxide (N2O4), dinitrogen pentoxide (N2O5), and nitrogen (N2);
one or more oxygen-based gas of oxygen (O2) and ozone (O3);
an organic (CxHyOz) gas of diethyl ether (C2H10O);
one or more sulfur oxide (SxOy)-based gas of sulfur monoxide (SO), sulfur dioxide (SO2), and sulfur trioxide (SO3);
one or more chlorine (Cl)-based gas of chloroform (CH3Cl), chlorine monoxide (ClO), dichlorine monoxide (Cl2O), chlorine dioxide, (ClO2) and chlorine (Cl2);
one or more fluorine (F)-based gas of oxygen fluoride (OF2, O2F2, O3F2) and fluororesin gas; and
one or more silicon (Si)-based gas of a halosilane (SiF4, SiCl3F, SiCL2FBr), an organosilane, a heterosilane and a silanol.

2. The method for preparing a sulfide-based solid electrolyte with superior air stability according to claim 1, wherein the sulfide-based solid electrolyte particle is crystallized by pre-heat treating, and then the crystallized sulfide-based solid electrolyte particle is treated under the reactive gas atmosphere.

3. The method for preparing a sulfide-based solid electrolyte with superior air stability according to claim 1, wherein the stabilization layer is formed by heat treating or plasma treating under a reactive gas atmosphere.

4. The method for preparing a sulfide-based solid electrolyte with superior air stability according to claim 1, wherein the stabilization layer is formed by heat-treating the sulfide-based solid electrolyte particle at 200-400° C. for 1 minute to 10 hours under a reactive gas atmosphere.

5. The method for preparing a sulfide-based solid electrolyte with superior air stability according to claim 2, wherein the stabilization layer is formed by heat-treating the sulfide-based solid electrolyte particle at 25-400° C. for 1 minute to 10 hours under a reactive gas atmosphere.

6. The method for preparing a sulfide-based solid electrolyte with superior air stability according to claim 1, wherein the stabilization layer is formed as a reactant derived from the reactive gas is physically or chemically bound to the surface of the sulfide-based solid electrolyte particle.

7. The method for preparing a sulfide-based solid electrolyte with superior air stability according to claim 1, wherein the reactive gas is supplied to the sulfide-based solid electrolyte particle at a pressure of 1-10 bars.

8. The method for preparing a sulfide-based solid electrolyte with superior air stability according to claim 1, wherein the preparing of the sulfide-based solid electrolyte particle includes the following steps:
preparing a mixture of phosphorus pentasulfide (P2S5) and lithium sulfide (Li2S); and
milling the mixture to obtain an amorphous sulfide-based solid electrolyte particle.

9. The method for preparing a sulfide-based solid electrolyte with superior air stability according to claim 1, wherein, in the forming of the stabilization layer the reactive gas atmosphere is provided by supplying nitrogen monoxide as a reactive gas at a pressure of 1-1.5 bars and then the stabilization layer comprising nitrogen functional groups derived from the nitrogen monoxide is formed on the surface of the sulfide-based solid electrolyte particle by heat-treating the sulfide-based solid electrolyte particle at 260-360° C. for 1-2 hours.

10. The method for preparing a sulfide-based solid electrolyte with superior air stability according to claim 2, wherein
in the crystallizing of the sulfide-based solid electrolyte particle, the sulfide-based solid electrolyte particle is crystallized by pre-heat treating at 260-360° C. for 1-2 hours, and
in the forming of the stabilization layer, the reactive gas atmosphere is provided by supplying nitrogen monoxide as a reactive gas at a pressure of 1-1.5 bars and then the stabilization layer comprising nitrogen functional groups derived from the nitrogen monoxide is formed on the surface of the sulfide-based solid electrolyte particle by heat-treating the sulfide-based solid electrolyte particle at 25-200° C. for 1-2 hours.

* * * * *